O. J. SCHMIDT.
WHEEL.
APPLICATION FILED APR. 12, 1919.

1,326,787.

Patented Dec. 30, 1919.
2 SHEETS—SHEET 1.

Witnesses
R. A. Thomas

Inventor
Oscar J. Schmidt

By Victor J. Evans
Attorney

O. J. SCHMIDT.
WHEEL.
APPLICATION FILED APR. 12, 1919.
1,326,787.
Patented Dec. 30, 1919.
2 SHEETS—SHEET 2.
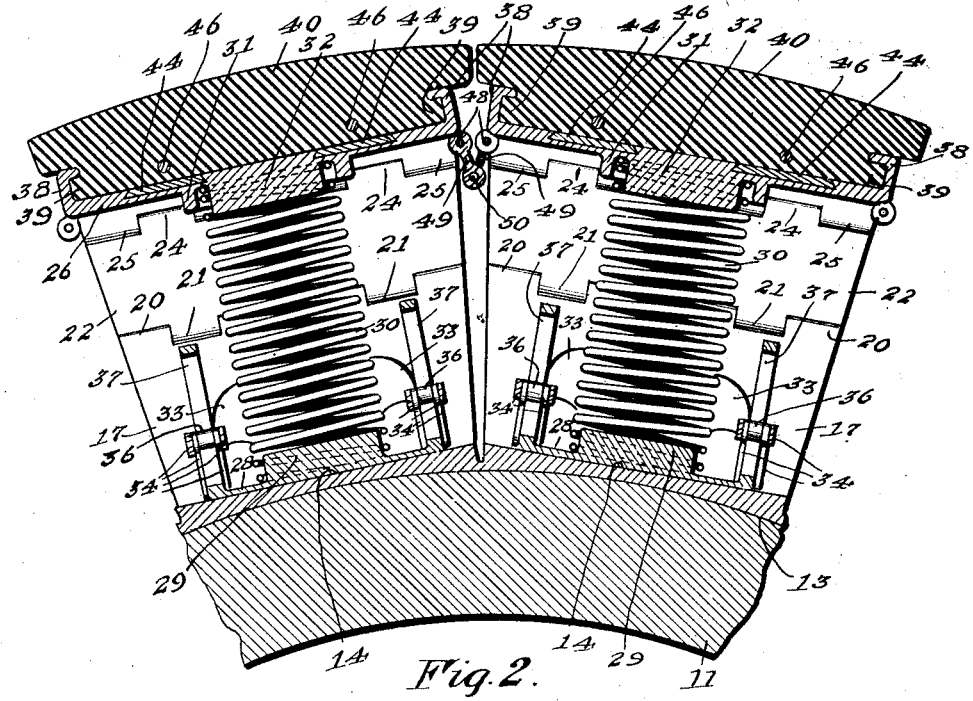
Fig. 2.
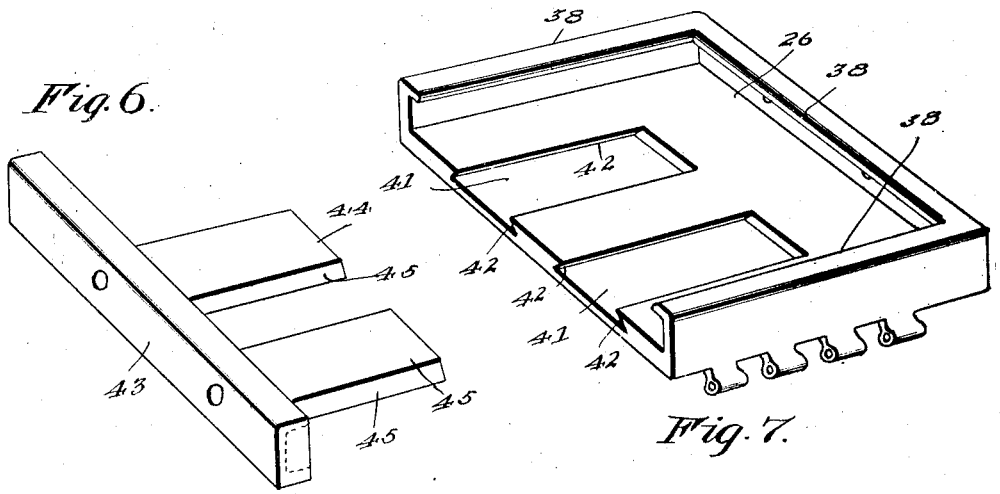
Fig. 6.
Fig. 7.
Witnesses
K. A. Thomas.
Inventor
Oscar J. Schmidt
By Victor J. Evans
Attorney

UNITED STATES PATENT OFFICE.

OSCAR J. SCHMIDT, OF BULVERDE, TEXAS.

WHEEL.

1,326,787.  Specification of Letters Patent.  Patented Dec. 30, 1919.

Application filed April 12, 1919. Serial No. 289,581.

*To all whom it may concern:*

Be it known that I, OSCAR J. SCHMIDT, a citizen of the United States, residing at Bulverde, in the county of Bexar and State of Texas, have invented new and useful Improvements in Wheels, of which the following is a specification.

This invention has reference to a resilient wheel tire.

The object of the invention is to produce a tire comprising a series of separated shoes arranged concentrically around the rim of the wheel, each of said shoes comprising a plurality of hingedly connected members spring influenced in an outward direction and having means for limiting the movement thereof in both an inward and outward direction, said shoes designed to independently absorb the shock to which the wheel is subjected when brought to ground contacting position, and each of said shoes also serving as a calk to increase the traction between the wheel and the ground surface and to prevent the skid of the wheel.

Other objects and advantages will appear as the nature of the invention is better understood, reference being had to the accompanying drawings in which there is illustrated a simple and satisfactory embodiment of the invention reduced to practice, it being understood, however, that the nature of the invention is such as to render the same susceptible to changes in form, proportion and details of construction, all such changes, however, falling within the scope of what is claimed.

In the drawings:

Fig. 2 is an approximately central longitudinal sectional view, upon an enlarged scale through the shoes secured on the rim of the wheel.

Fig. 6 is a perspective view of the removable side of one of the sections of the tread carrying rim.

Fig. 7 is a perspective view of the other section of the rim.

Figure 1:
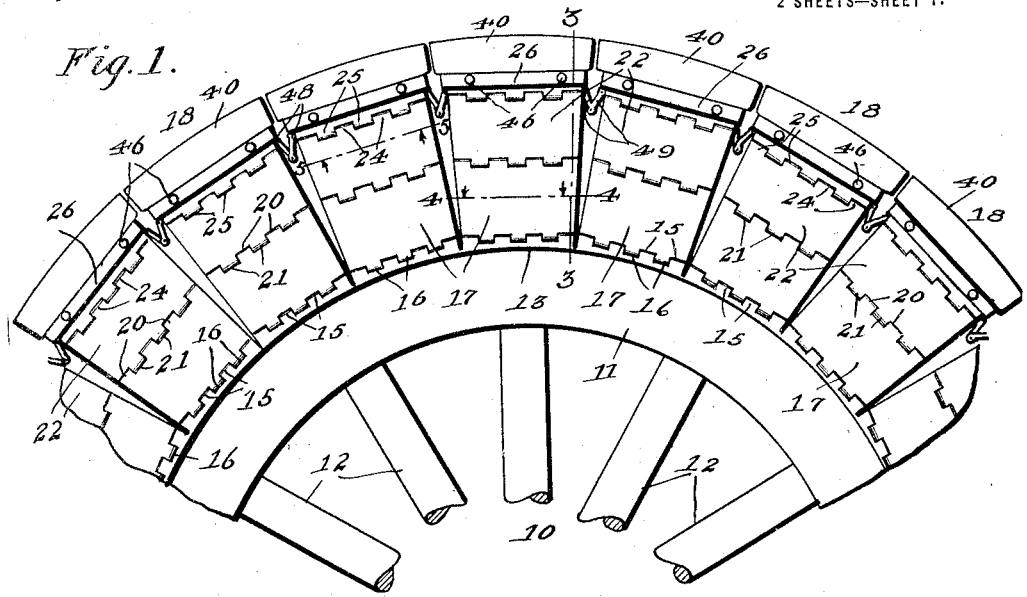
Figure 1 is a side elevation of a portion of a wheel provided with the improvement.
Figure 3:
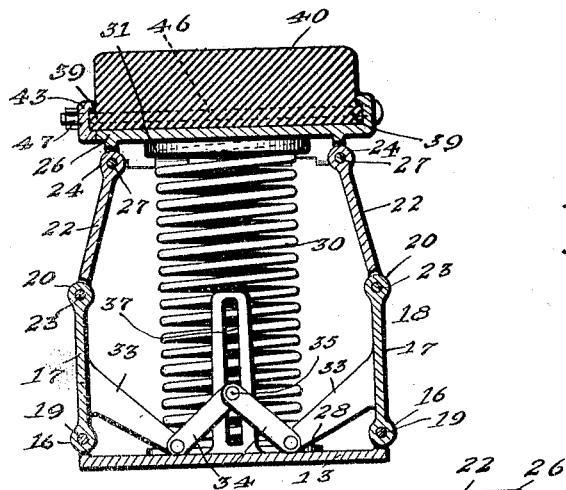
Fig. 3 is a transverse sectional view approximately on the line 3—3 of Fig. 1 upon an enlarged scale.
Figure 4:
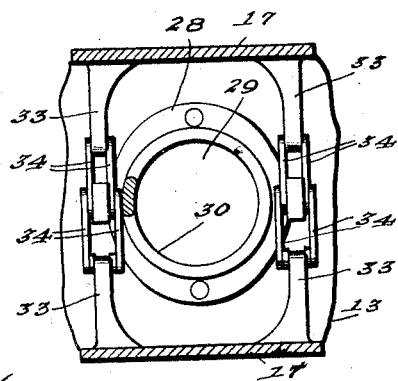
Fig. 4 is a sectional view approximately on the line 4—4 of Fig. 1 upon an enlarged scale.
Figure 5:
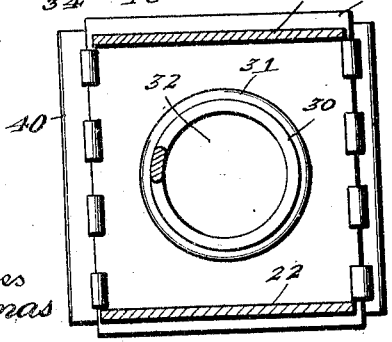
Fig. 5 is a sectional view upon an enlarged scale, approximately on the line 5—5 of Fig. 1.

Referring now to the drawings in detail, the numeral 10 designates a portion of a vehicle wheel having the felly 11 connected to the outer ends of the spokes 12 thereof, and secured on the felly is the rim 13. The rim upon the outer surface thereof is integrally formed with enlargements in the nature of blocks 14, the said blocks being equally distributed throughout the circumference of the rim and having their outer straight surfaces, of course, arranged angularly with respect to each other. The enlargements or blocks, upon the edges thereof are formed with outstanding rounded portions providing spaced butts 15.

Between the butts 15 of the respective blocks 14 are received spaced depending rounded elements providing butts 16 upon the inner members 17 of the shoes 18 that provide the tire for the vehicle. Passing through the butts 15 and 16 are pintles 19 that connect the members 17 of the respective shoes to the respective blocks 14.

The outer edges of the members or sections 17 have spaced projecting curved or rounded portions that provide butts 20. Between these butts are butts 21 formed upon the inner edges of the outer members or sections 22 of the shoes 18, the pivots 23 passing through the butts 20 and 21.

The outer edges of the outer members or sections 22 of the shoes 18 are also provided with butts 24 that receive therebetween depending butts 25 on the tread carrying rim 26 of each of the shoes 18, a pintle 27 passing through the butts 24 and 25. By this arrangement it will be seen that the tire carrying rim is hingedly connected to the outer shoe sections, that the outer shoe sections are hingedly connected to the inner shoe sections and that the inner shoe sections are hingedly connected to the wheel rim.

Each of the shoes comprises a substantially rectangular member, the sides of which being constructed of plates, and consequently the confronting edges of the shoes are gradually spaced away from each other from the hinge connection of the shoes with the wheel rim to the outer or tire carrying rims of the respective shoes.

Secured on the outer flat face of each of the blocks 14 inward of the butts on the edges thereof is a plate 28. Each plate 28 has an outstanding lug 29. On each of the plates, and surrounding each of the lugs 29 is a helical spring 30.

On the inner face of each of the tire carrying rims 26 for the respective shoes 18 is an enlargement 31 that is approximately centrally provided with a depending round lug 32 disposed opposite the lug 29. The enlargement may be provided with a round depression at the juncture of the lug therewith to receive the opposite end of the spring 30. The spring engaging with the lugs 29 and 30 is held against lateral movement and against bulging, and the springs for the respective shoes hold the hinged sides thereof in proper normal relation to each other. By reference to the drawings it will be noted that in normal position the outer sections 22 of the sides are retained at an inward angle with respect to the inner sections and that the inner sections are held straight, or at a right angle with respect to the straight edges of the blocks 14 on the rim 13. The inner sections or side members of the respective shoes are retained in such position in the following manner: the sections 17 each have spaced inwardly extending angularly disposed arms 33 of equal lengths. These arms, by the pressure of the springs 30 are forced into contact with the blocks 14. Pivotally connected to each of the arms is a pair of angularly disposed links 34. The confronting ends of the respective pairs of links are pivotally connected as at 35, and on each of the pivots 35 is a roller 36. Each of the rollers is received in the slot of a brace bar 37 which is preferably integrally formed on the opposite edges of the plates 28.

It should be stated that any desired number of springs may be employed in each of the shoes, and likewise the inner sections or sides of the shoes may be provided with any desired number of arms 33 which are necessarily arranged in pairs and are connected with links as above described, the said links having their pivots passing through brace bars which are arranged on the opposite sides of the springs.

The tire carrying rim 26 of the respective shoes is in the nature of a box-like member open at one of its sides. The flanged portions of the rim have their outer edges inturned to provide beads or flanges 38 which are received in grooves in the compressible tread blocks 40 when the latter are arranged in the rims 26. The open side of each tread carrying rim 26 is closed by a removable side 43. This side has its lower and inner edge provided with spaced tongues 44 that have beveled edges 45. The bottom wall of the tire carrying rim from the open side thereof has spaced grooves 41, the side walls provided thereby being beveled as at 42. The tongues 44 slide in the grooves 41. Through the removable sides 43, through the tread blocks 40 and through one of the sides of each of the tire carrying rims pass bolts 46 that are engaged by nuts 47, and whereby the tread blocks and removable sides are secured to the tire carrying rims.

The ends of the tread carrying rims have hingedly secured thereto, as at 48, inwardly extending angularly disposed plates or links 49, and the inner and confronting ends of the said plates or links are pivotally connected as at 50. The outward swinging of both the inner and outer sections is restricted by the springs 30 and the toggle connection between the links 34 and the arms 33 of the inner shoe sections.

It is believed, from the foregoing description, when taken in connection with the drawings, the simplicity of the construction and the advantages thereof will be readily apparent without further detailed description.

Having thus described the invention, what is claimed as new, is:—

1. A resilient wheel tire, comprising a plurality of shoes hingedly connected to the rim of a wheel, each of said shoes comprising a plurality of hingedly connected members, a tread block carried by each of the shoes, link connections between the outer members of the respective shoes, spring means for normally retaining the shoe members in one position, and means for limiting the movement of the shoe members in both directions.

2. A resilient wheel tire, comprising shoes arranged around the rim of a wheel and having sides hingedly connected to said rim, each of said shoes having the sides thereof comprising a plurality of hinged sections, a tread carrying rim for each of the shoes hingedly connected to the outer side sections, and tread blocks on said tread carrying rims, hingedly connected links pivotally secured to the confronting tread carrying rims, spring means in each of the shoes for normally retaining the sections thereof in one position, and means for limiting the outward swinging of the side sections of the shoes when the shoes are brought to road engaging contact.

3. In combination with a vehicle wheel, of blocks on the rim thereof and arranged circumferentially around said rim, a resilient tread comprising a plurality of shoes, each of which having its sides constructed of a plurality of hingedly connected plates and the inner plates being hingedly connected to the blocks of the wheel rim, a compressible tread block on each of the shoes, hinged links pivotally connected to the confronting ends of the respective shoes, spring means for retaining the sectional shoes in one position, inwardly extending arms on the inner side sections of the respective shoes normally contacting with the blocks, links connected to the inner ends of said arms, slotted guide plates on the blocks, pivots connecting the respective pairs of links, and rollers on said pivots received in the slots of the said guide plates.

In testimony whereof I affix my signature.

OSCAR J. SCHMIDT.